United States Patent
Berrange

(10) Patent No.: US 12,306,932 B2
(45) Date of Patent: May 20, 2025

(54) ATTESTING ON-THE-FLY ENCRYPTED ROOT DISKS FOR CONFIDENTIAL VIRTUAL MACHINES

(71) Applicant: Red Hat, Inc., Raleigh, NC (US)

(72) Inventor: Daniel Pierres Berrange, Farnborough (GB)

(73) Assignee: Red Hat, Inc., Raleigh, NC (US)

( * ) Notice: Subject to any disclaimer, the term of this patent is extended or adjusted under 35 U.S.C. 154(b) by 252 days.

(21) Appl. No.: 18/126,918

(22) Filed: Mar. 27, 2023

(65) Prior Publication Data

US 2024/0330435 A1 Oct. 3, 2024

(51) Int. Cl.
*G06F 21/53* (2013.01)
*G06F 21/60* (2013.01)
*G06F 21/64* (2013.01)

(52) U.S. Cl.
CPC ............ *G06F 21/53* (2013.01); *G06F 21/602* (2013.01); *G06F 21/64* (2013.01)

(58) Field of Classification Search
CPC ......... G06F 21/53; G06F 21/602; G06F 21/64
See application file for complete search history.

(56) References Cited

U.S. PATENT DOCUMENTS

| | | | | |
|---|---|---|---|---|
| 11,055,428 B1* | 7/2021 | Clerget | ............... | G06F 21/6209 |
| 2011/0246778 A1* | 10/2011 | Duane | .................... | G06F 21/57 |
| | | | | 713/168 |
| 2015/0278531 A1* | 10/2015 | Smith | ................ | H04L 63/0428 |
| | | | | 713/165 |
| 2016/0140343 A1* | 5/2016 | Novak | .................. | G06F 21/575 |
| | | | | 713/2 |
| 2018/0295105 A1* | 10/2018 | Feng | .................... | H04L 63/0428 |
| 2019/0034218 A1* | 1/2019 | El-Moussa | .............. | H04L 63/06 |

(Continued)

FOREIGN PATENT DOCUMENTS

CN 111625871 A * 9/2020
WO 2021057024 A1 4/2021

OTHER PUBLICATIONS

Bossi S, Visconti A. What users should know about full disk encryption based on LUKS. InCryptology and Network Security: 14th International Conference, CANS 2015, Marrakesh, Morocco, Dec. 10-12, 2015, Proceedings 14 2015 (pp. 225-237). Springer International Publishing. (Year: 2015).*

(Continued)

*Primary Examiner* — Michael R Vaughan
*Assistant Examiner* — Ethan V Vo
(74) *Attorney, Agent, or Firm* — Womble Bond Dickinson (US) LLP

(57) ABSTRACT

Responsive to a request for an encrypted confidential virtual machine (CVM) disk image, an unencrypted CVM disk image, an image signature, and a public key associated with the image signature is obtained. The CVM disk image is encrypted to produce an encrypted CVM disk image. Full disk encryption (FDE) is applied against the encrypted CVM disk image to obtain an FDE header. A concatenation of the image signature, the public key associated with the image signature, and the FDE header is signed to obtain an image encryption service (IES) signature. The IES signature and associated certificate chain are written to the extensible firmware interface system partition (ESP) of the encrypted CVM disk image.

20 Claims, 11 Drawing Sheets

(56) References Cited

U.S. PATENT DOCUMENTS

| | | |
|---|---|---|
| 2021/0409199 A1 | 12/2021 | Tsirkin |
| 2022/0129544 A1* | 4/2022 | Touitou .................. G06F 21/64 |
| 2022/0222100 A1 | 7/2022 | Srivastava et al. |
| 2022/0391494 A1 | 12/2022 | Yang et al. |
| 2022/0394015 A1 | 12/2022 | Han et al. |
| 2023/0106781 A1* | 4/2023 | Srinivasan .............. G06F 21/16 |
| | | 713/176 |
| 2024/0184928 A1* | 6/2024 | Kim .................... H04L 63/0823 |

OTHER PUBLICATIONS

Bro, Milan. "Authenticated and resilient disk encryption." (2018). (Year: 2018).*

Alarood, Alaa Abdulsalm et al. "IES: Hyper-chaotic plain image encryption scheme using improved shuffled confusion-diffusion", Ain Shams Engineering Journal, vol. 13, Issue 3 (May 2022), pp. 1-12, https://doi.org/10.1016/j.asej.2021.09.010.

Zhang, Shijie et al. "A Novel Plain-Text Related Image Encryption Algorithm Based on LB Compound Chaotic Map", Mathematics 9, No. 21: 2778 (Nov. 2, 2021), pp. 1-25, https://doi.org/10.3390/math9212778.

* cited by examiner

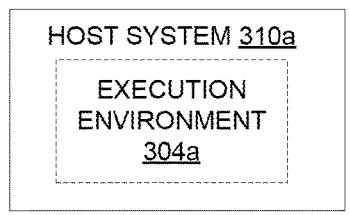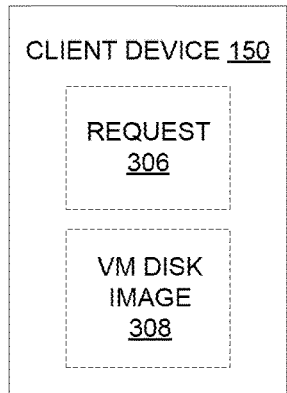
FIG. 3

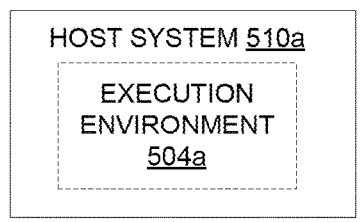
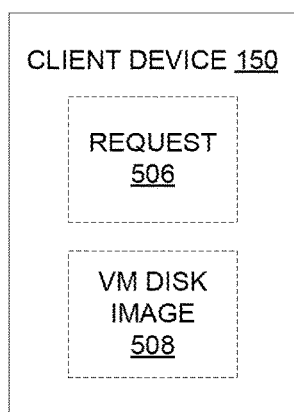
FIG. 5

700

RESPONSIVE TO A REQUEST FOR AN ENCRYPTED CONFIDENTIAL VIRTUAL MACHINE (CVM) DISK IMAGE, OBTAIN A PLAIN TEXT DISK IMAGE TEMPLATE AND A SIGNATURE ASSOCIATED WITH THE PLAIN TEXT DISK IMAGE TEMPLATE
710

PROCESS THE PLAIN TEXT DISK IMAGE TEMPLATE TO PRODUCE AN ENCRYPTED CVM DISK IMAGE AND VERIFY THE SIGNATURE OF THE PLAIN TEXT DISK IMAGE TEMPLATE
720

APPLY FULL DISK ENCRYPTION (FDE) AGAINST THE ENCRYPTED CVM DISK IMAGE TO OBTAIN AN FDE HEADER
730

SIGN A CONCATENATION OF THE IMAGE SIGNATURE AND THE FDE HEADER TO OBTAIN AN IMAGE ENCRYPTION SERVICE (IES) SIGNATURE
740

WRITE THE IES SIGNATURE TO AN EXTENSIBLE FIRMWARE INTERFACE SYSTEM PARTITION (ESP) OF THE ENCRYPTED CVM DISK IMAGE
750

ATTESTING ON-THE-FLY ENCRYPTED ROOT DISKS FOR CONFIDENTIAL VIRTUAL MACHINES

TECHNICAL FIELD

Aspects of the present disclosure relate to secure cloud computing, and more particularly, to generating and managing a confidential virtual machine image that can be deployed in a cloud computing environment.

BACKGROUND

Computing systems may rely on cloud computing environments to execute one or more applications and/or to provide computing services. Disk images are a convenient way of packaging applications for deployment. Cloud computing environments may provide computing resources that can be used by the computing systems to serve as repositories for disk images. In particular, disk images can be requested and retrieved from centralized repositories that provide availability and security.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments without departing from the spirit and scope of the described embodiments.

FIG. 3 is a depiction of an example of a client device transmitting a request to create a confidential virtual machine image in a confidential virtual machine architecture, in accordance with embodiments of the disclosure.

FIG. 5 is a depiction of an example of a client device transmitting an update to a virtual machine disk image of an on-the-fly confidential virtual machine architecture, in accordance with embodiments of the disclosure.

FIG. 7 is a flow diagram of a method of provisioning an on-the-fly confidential virtual machine disk image, in accordance with some embodiments.

DETAILED DESCRIPTION

Figure 1:
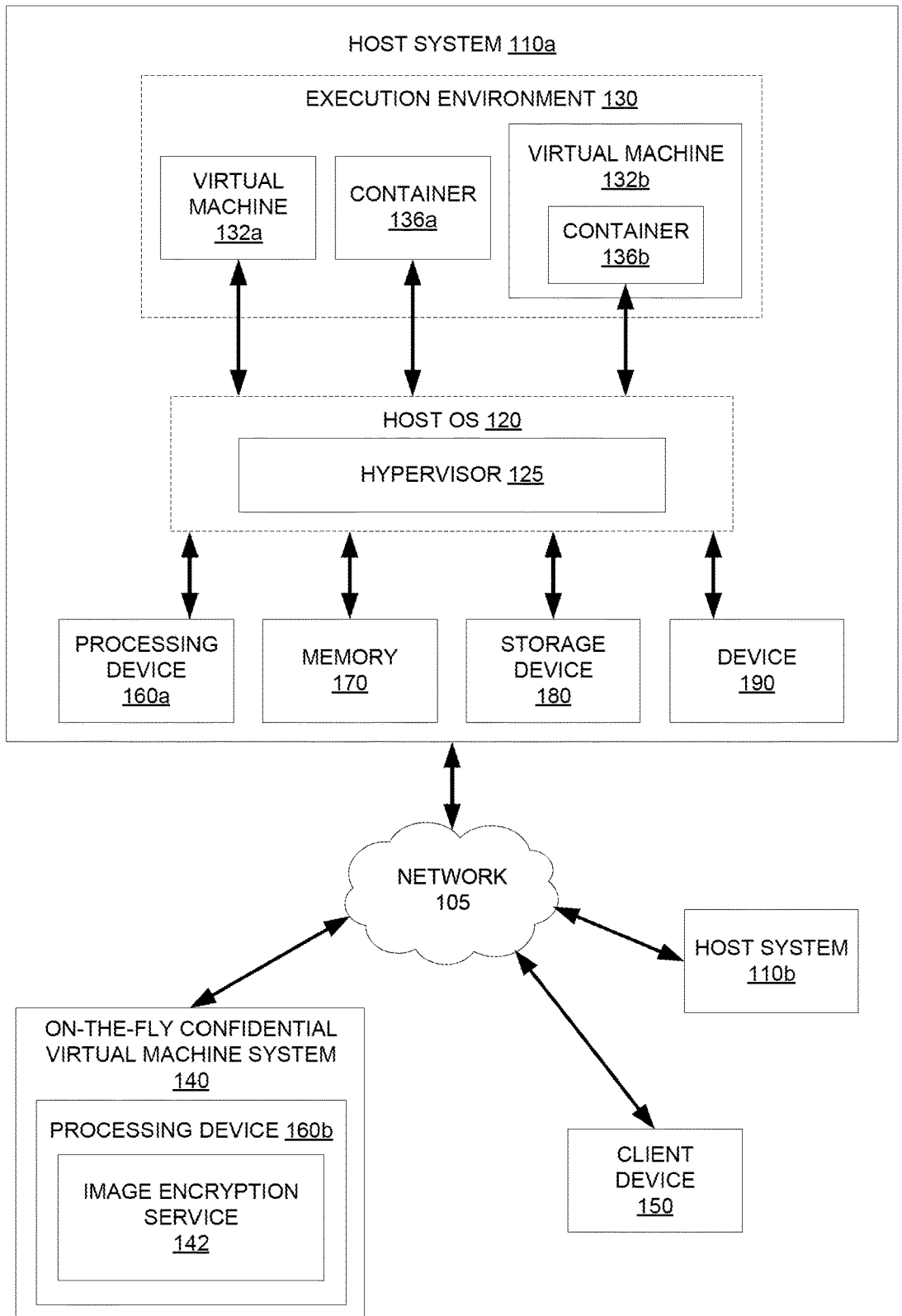
FIG. 1 is a block diagram that illustrates an example confidential virtual machine architecture, in accordance with some embodiments.

A virtual machine (VM) is a virtual environment that functions as a virtual computer system with its own CPU, memory, network interface, and storage, created on a physical hardware system, called a host. Software called a hypervisor separates the host's hardware resources and provisions them appropriately so they can be used by one or more VMs deployed on the host. Many virtualization platforms also allow nested virtualization, in which a first level guest can act as a hypervisor for launching a second level guest, which can in turn act as a hypervisor for a third level guest. In such an environment, only in the base layer will the hypervisor be on physical hardware. In subsequent layers, the hypervisor will be partitioning virtual hardware. A VM can also include a standard package of software that bundle an application's code together with related configuration files and libraries, and the dependencies required for the application to run. Such a software bundle can allow organizations to deploy applications seamlessly and more efficiently across environments. This workflow allows for agility, portability, and rapid scalability. VMs can be packaged as virtual disk images and booted, just like hard drives.

However, while VM images are a convenient way of packaging applications for deployment, VM images don't meet the confidentiality requirements to be safely deployed into a confidential computing trusted execution environment (TEE). In order to ensure the confidentiality and protection of sensitive data, the VM image usually needs to be encrypted. Furthermore, a confidential VM needs to be subject to verification and attestation by an external service. The conventional confidential VM ecosystem lacks the tools to configure and secure such workloads In particular, deployments of VMs that are managed by a cloud provider can be affected by the particular cloud provider's deployment process and may involve code provided by the cloud provider. The deployment process can destroy any cryptographic assurance that a VM and its associated applications have been deployed free from tampering.

Aspects of the present disclosure address the above-noted and other deficiencies by presenting methods and systems for transforming regular VM images into confidential VM images that can be securely deployed inside a TEE managed by a cloud provider.

Virtualization is the process of creating a simulated computing environment that's abstracted from the computing hardware-essentially a computer-generated computer. Virtualization allows the creation of multiple, virtual computing instances from the hardware and software components of a single machine. Those instances could be a computer in the traditional sense, or a storage repository, application, server, or networking configuration.

The software that enables virtualization is called a hypervisor. A hypervisor is a lightweight software layer that sits between the physical hardware and the virtualized environments, or between nested virtualized environments, and allows multiple operating systems (OS) to run in tandem. The hypervisor acts as a middleman to pull resources from the raw materials of the hardware infrastructure and direct them to the various computing instances.

The computer-generated computers that virtualization makes possible are known as virtual machines (VMs)- separate computers running on hardware that may be contained in a single physical computer, sometimes called a host. Each VM requires its own OS. The OS and any applications running on an individual VM share hardware resources from a single host server or from a pool of host servers. Thanks to the hypervisor, the hardware resources are virtualized and each VM is isolated from its neighbors. However, the VMs are not isolated from the hypervisor.

Confidential computing isolates sensitive data in a protected CPU enclave during processing. The contents of the enclave, which includes the data being processed and the techniques being used to process it, are accessible only to authorized processing code and are invisible to anything or anyone else, including the hypervisor, and (in a cloud computing environment) the cloud provider. While various encryption services can protect data at rest (in storage and/or databases) and data in transit across network connections, confidential computing addresses the protection of data in use, e.g., during processing or runtime.

Applications process data, and to do this, they interface with a computer's memory. Before an application can process data, it has to perform decryption in memory. Because the data is, for a moment, unencrypted, it is left exposed. It can be accessed, encryption-free, immediately before, during, and after it has been processed. This can leave it exposed to threats such as memory dump attacks, which involve capturing the contents of random-access memory (RAM) exported to a storage drive in the event of an unrecoverable error. An attacker, perhaps possessing administrative privileges, triggers this error as part of the attack, forcing the data to be exposed. Data can also be exposed through root user compromises, which can occur when the wrong person gains access to administrative privileges that offer data access before, during, and after it has been processed.

Confidential computing addresses this issue by using a hardware-based architecture referred to as a trusted execution environment (TEE). This can involve the use of a secure coprocessor inside a CPU. Embedded encryption keys can be used to secure the TEE. To make sure the TEEs are only accessible to the application code authorized for it, the coprocessor can use embedded attestation mechanisms. If the system comes under attack by malware or unauthorized code as it tries to access the encryption keys, the TEE will deny the attempt at access and cancel the computation. A trusted platform module (TPM) is a dedicated microprocessor designed to secure hardware by integrating cryptographic keys into devices. In practice a TPM can be used for various different security applications such as secure boot, key storage and random number generation. A TPM can provide cryptographic keys to support a TEE A TPM may further include Platform Configuration Registers (PCRs), which are memory locations in the TPM that provide methods to cryptographically record (measure) software state: both the software running on a platform and configuration data used by that software. The PCR update calculation, called an extend, uses a one-way hash so that measurements can't be removed. These PCRs can then be read to report their state. They can also be signed to return a more secure report, the attestation.

Pre-boot firmware can also maintain an event log that is updated every time something gets bashed by the TPM to any of the PCR registers. The events are segregated by their type and contain the value of the bashed PCR register. Typically, the pre-boot firmware will hash the components including to whom execution is to be handed over or actions relevant to the boot process.

The event log can be used to support remote attestation. Attestation is used to provide information about the platform's state to a challenger. However, PCR contents can be difficult to interpret; therefore, attestation can be more useful when the PCR contents are accompanied by a measurement log. While not trusted on their own, the measurement log contains a richer set of information than do the PCR contents. The PCR contents can be used to validate the measurement log.

This mechanism allows sensitive data to stay protected while in memory. When an application tells the TEE to decrypt its private data, the data is released for processing. While the data is decrypted and being processed by the computer, it is invisible to others. This includes the cloud provider, other computer resources, hypervisors, virtual machines, and even the operating system.

Confidential computing can have many uses pertaining to protecting data in trusted environments. For example, confidential computing can be used to protect data from malicious attackers, make sure data complies with legislation such as General Data Protection Regulations (GDPR), ensure the safety of data such as financial data, encryption keys or any other data that needs to be secure, make sure data in use is protected when migrating workloads to different environments, and allow developers to create applications that can be moved across different cloud platforms.

Different hardware manufacturers employ different hardware solutions to provide confidential computing. For example, Intel® offers Software Guard Extensions (Intel® SGX®) and Trust Domain Extensions (Intel® TDX®). AMD® offers Secure Encrypted Virtualization (SEV).

However, implementing confidential computing across multiple VMs in a cloud environment can still be a challenge. While each VM may have its own operating system, each VM is sharing processing devices and memory with other VMs running on a host. A confidential VM may be defined as "a virtual machine that is executed inside a hardware-based TEE, whereby code and data within the entire VM image is protected from the hypervisor and the host operating system." Similarly, a virtual TPM, or vTPM, is a virtualized software implementation of a TPM that can be attached to a VM and provide the same features and functionality that a physical TPM would provide to a physical system. Even with this level of isolation, however, every confidential VM deployment is constrained by the particular cloud provider's deployment process and may involve code and processes provided by the cloud provider that are concealed from a guest. This constraint can destroy the cryptographic assurance that an application is isolated and free from tampering.

Confidential virtualization aims to make it possible to run virtual machines on a 3rd-party (or cloud) hosting service, without any requirement to trust the software stack provided by the hosting service or privileged users, e.g., administrators, of the hosting service. During an early boot phase, attestation can be performed against the hardware platform, virtual hardware state, firmware, and the operating system (OS) kernel image to prove confidentiality of the virtual machine Upon successful attestation, the guest OS can be granted access to credentials that allow it to unlock an encrypted root disk.

There are a variety of ways to provision a disk image for use as a VM. First, the guest owner, e.g., the person wishing to create a confidential virtual machine (CVM) in a cloud environment, can provide a pre-encrypted disk image, which can be used for a single CVM. Alternatively, the guest owner can provide a pre-encrypted disk image template, which is re-encrypted for each CVM on its first boot to obtain a unique full-disk encryption (FDE) master key usable exclusively for that CVM, noting that best security practices suggest that keys not be re-used for multiple CVMs. In a third approach, the guest owner can provide a plain text disk image template, which can be encrypted on first boot for each CVM or encrypted by the guest operation system during first boot for each CVM. In some cases, a plain text disk image template can be referred to as a CVM disk image. For all of these scenarios, however, proving that the final root disk that is attached to the CVM matches the one requested and expected can be a challenge.

A virtual disk image is a replica of a portion of an actual hard disk. It includes the complete contents and data structure of a physical hard disk, which also includes a boot loader. Upon launching a VM, the hypervisor will execute the guest firmware. The firmware will define an approach for locating the operating system to load and execute. Often the firmware will end up launching a boot loader, which will take over the job of locating and executing the operating system. The boot loader can be located at a known place on a hard disk (or a virtual disk) and initiates the actual loading and execution of the operating system.

When the supplied disk image is pre-encrypted with a unique key, it is relatively easy to establish provenance because, assuming it was uniquely generated, the supplied disk unlock passphrase/token will only work for the expected image. When the supplied image is pre-encrypted and needs re-encrypting, the initial FDE unlock prior to re-encryption can prove it is the expected image. When the supplied image is plain text, however, it can be much more challenging to prove correctness. There is no efficient way to prove that the content in the encrypted image actually matches that of the requested plain text disk image template. If a guest owner were to try to verify the encrypted disk content, at boot time, the guest owner would likely have to read the entire image payload, which may be 10's or 100's of GB in size. This is likely impractical.

When supplying an image in plain text, the cloud provider may choose to provide a piece of software that applies encryption before the CVM is initially booted. This can be referred to as Image Encryption Software or an Image Encryption Service (IES). An assumption can be made that an IES is itself running inside a CVM (or an equivalently confidential environment, such as an Intel® SGX® enclave) and that an attestation report can be obtained so proving that it is running in a CVM as well as proving integrity of its entire software stack. Establishing the integrity of the IES can guarantee the particular set of steps the IES will perform to create an image. It can thus be demonstrated that any given plain text template input will be faithfully transformed into the desired encrypted image output.

Despite establishing trust of the IES itself, one cannot prove that a correct plain text image template was provided to the IES, e.g., demonstrating that the text image has remained unmodified after being uploaded to a cloud image library. To prove an absence of tampering, any plain text template needs to be accompanied by a cryptographic signature that covers its entire content, and the public key associated with the signature. If, upon a download request, the IES can successfully verify the signature against the content of the text image, it can be guaranteed that the image has been unmodified since its upload. The IES already needs to read the entire (unencrypted) source image in order to create the encrypted disk image, so concurrently verifying the signature introduces negligible I/O overhead.

There is a further assumption that the guest owner has created the plain text disk image template on a trusted host, whether a laptop or established CVM, such that the image (and its signature) uploaded to the cloud image library is clean. After signing the disk image template, the disk image template can be uploaded to a repository in either a private cloud or the public cloud.

Deployment of a trusted text image (disk image) requires 1) proof that the encrypted disk image was created by a trusted IES; and 2) proof that the cryptographic signature previously verified by the IES matches that of the requested disk image. While the IES is attested, it can be assigned a unique certificate and private/public key pair. The guest owner can use either a private certificate authority (CA) or a CA provided by the cloud hosting service. The private key can be used as a signing key to establish a link between the source image and the encrypted output image. The data to be signed is a concatenation of the signature of the input image, the public key associated with the signature, and the full-disk-encryption (FDE) header of the encrypted output disk image. The IES can write this signature into a well-known path in the Extensible Firmware Interface (EFI) system partition (ESP) of the encrypted output disk image, along with files containing the IES certificate chain, and the input image signature. The ESP is a partition on a data storage device used by computers possessing a Universal EFI (UEFI) firmware interface. The EFI is always plain text and provides an interface between an operating system and platform firmware.

Upon deployment, during the early phase of the boot process, the guest OS can read the input image signature and the public key associated with the signature from the ESP, read the FDE header from the encrypted disk, verify their concatenation with the signature, and unlock the encrypted disk image.

After signature verification, the launching process can extend a designated platform configuration register (PCR) in the virtual trusted platform module (vTPM) for the CVM with the signature of the input image, the IES certificate, and the CA chain that signed the IES certificate. The boot process can then unlock the encrypted disk image and continue with the next phase of booting the operating system in the disk image.

Post-installation and boot, the guest owner can request an attestation report from the running CVM as well as verify the TPM event log PCRs. When validating the attestation report, the owner (or an attestation server operating on their behalf) may check whether the reported IES certificate is present in a certificate revocation list (CRL).

Although aspects of the disclosure may be described in the context of an on-the-fly confidential virtual machine architecture, embodiments of the disclosure may be applied to any computing system that configures and manages virtual machines, whether confidential or non-confidential.

FIG. 1 is a block diagram that illustrates an example on-the-fly confidential virtual machine architecture 100, in accordance with some embodiments. However, other on-the-fly confidential virtual machine architectures are possible, and the implementation of a computer system utilizing examples of the disclosure are not necessarily limited to the specific architecture depicted by FIG. 1.

As shown in FIG. 1, on-the-fly confidential virtual machine architecture 100 includes host systems 110a and 110b, on-the-fly confidential virtual machine system 140, and client device 150. The host systems 110a and 110b, on-the-fly confidential virtual machine system 140, and client device 150 may each include hardware such as processing devices 160*a* and 160*b*, memory 170, which may include volatile memory devices, e.g., random access memory (RAM), non-volatile memory devices, e.g., flash memory, and/or other types of memory devices, a storage device 180, e.g., one or more magnetic hard disk drives, a Peripheral Component Interconnect (PCI) solid state drive, a Redundant Array of Independent Disks (RAID) system, or a network attached storage (NAS) array, and one or more devices 190, e.g., a Peripheral Component Interconnect (PCI) device, a network interface controller (NIC), a video card, or an I/O device. In certain implementations, memory 170 may be non-uniform access (NUMA), such that memory access time depends on the memory location relative to processing devices 160*a* and 160*b*. It should be noted that although, for simplicity, a single processing device 160*a* or 160*b*, storage device 180, and device 190 are depicted in FIG. 1, other embodiments of host systems 110*a* and 110*b*, on-the-fly confidential virtual machine system 140, and client device 150 may include multiple processing devices, storage devices, or devices. Processing devices 160*a* and 160*b* may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing devices 160*a* and 160*b* may also include one or more special-purpose processing devices such as an application specific integrated circuit (ASIC), a field programmable gate array (FPGA), a digital signal processor (DSP), network processor, or the like.

Each of the host systems 110*a* and 110*b*, on-the-fly confidential virtual machine system 140, and client device 150 may be a server, a mainframe, a workstation, a personal computer (PC), a mobile phone, a palm-sized computing device, etc. In some embodiments, host systems 110*a* and 110*b*, on-the-fly confidential virtual machine system 140, and/or client device 150 may be separate computing devices. In some embodiments, host systems 110*a* and 110*b*, on-the-fly confidential virtual machine system 140, and/or client device 150 may be implemented by a single computing device. For clarity, some components of on-the-fly confidential virtual machine system 140, host system 110*b*, and client device 150 are not shown. In some embodiments, the on-the-fly confidential virtual machine system 140 may include a virtual machine-orchestration system. Furthermore, although on-the-fly confidential virtual machine architecture 100 is illustrated as having two host systems, embodiments of the disclosure may utilize any number of host systems.

Host systems 110*a* and 110*b* may additionally include execution environments 130, which may include one or more virtual machines (VMs) 132*a*, containers 136*a*, containers 136*b* residing within virtual machines 132*b*, and a host operating system (OS) 120. VM 132*a* and VM 132*b* are software implementations of machines that execute programs as though they were actual physical machines. Containers 136 act as isolated execution environments for different workloads of services, as previously described. Host OS 120 manages the hardware resources of the host system 110*a* and provides functions such as inter-process communication, scheduling, memory management, and so forth.

Host OS 120 may include a hypervisor 125, which may also be known as a virtual machine monitor (VMM), can provide a virtual operating platform for VMs 132*a* and 132*b* and manages their execution. Hypervisor 125 may manage system resources, including access to physical processing devices, e.g., processors or CPUs, physical memory, e.g., RAM, storage devices, e.g., HDDs or SSDs, and/or other devices, e.g., sound cards or video cards. The hypervisor 125, though typically implemented in software, may emulate and export a bare machine interface to higher level software in the form of virtual processors and guest memory. Higher level software may comprise a standard or real-time OS, may be a highly stripped-down operating environment with limited operating system functionality, and/or may not include traditional OS facilities, etc. Hypervisor 125 may present other software, i.e., "guest" software, the abstraction of one or more VMs that provide the same or different abstractions to various guest software, e.g., a guest operating system or guest applications. It should be noted that in some alternative implementations, hypervisor 125 may be external to host OS 120, rather than embedded within host OS 120, or may replace host OS 120.

The host systems 110*a* and 110*b*, on-the-fly confidential virtual machine system 140, and client device 150 are coupled to each other, e.g., may be operatively coupled, communicatively coupled, or may communicate data/messages with each other, via network 105. Network 105 may be a public network, e.g., the internet, a private network, e.g., a local area network (LAN) or a wide area network (WAN), or a combination thereof. In one embodiment, network 105 may include a wired or a wireless infrastructure, which may be provided by one or more wireless communications systems, such as a WiFi™ hotspot connected with the network 105 and/or a wireless carrier system that can be implemented using various data processing equipment, communication towers, e.g., cell towers. The network 105 may carry communications, e.g., data, message, packets, or frames, between the various components of host systems 110*a* and 110*b*, on-the-fly confidential virtual machine system 140, and/or client device 150.

In some embodiments, processing device 160*b* may execute image encryption system 142, which in some cases contains image encryption service (IES). The image encryption service 142 may receive a request from client device 150 to execute a workload. The image encryption service 142 may identify communication endpoints for execution environment(s) that are to execute the workload at host system 110*a* and/or host system 110*b*. The image encryption service 142 may configure the network connections to facilitate communication between the execution environment(s) and the client device 150. Further details regarding image encryption service 142 will be discussed at FIGS. 2-12 below.

Figure 2:
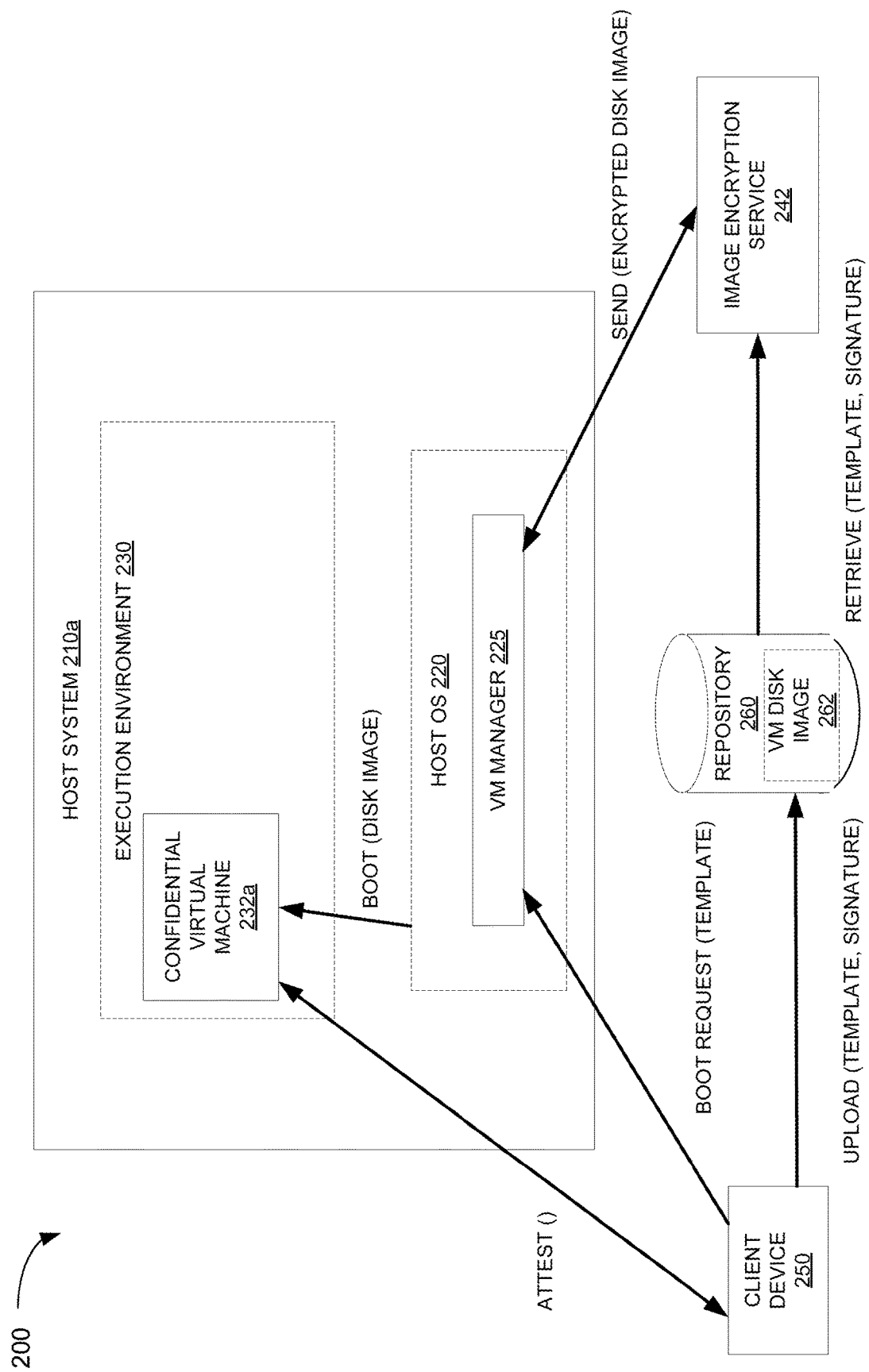
FIG. 2 is a flow diagram of a life cycle process for a confidential virtual machine disk image architecture, in accordance with some embodiments.

FIG. 2 is a flow diagram of a life cycle process 200 for an on-the-fly confidential virtual machine image architecture, in accordance with some embodiments. FIG. 2 includes a host system 210*a*, an execution environment 230, a confidential virtual machine 232*a*, a host OS 220, a VM manager 225, a client device 250, a repository 260, and an image encryption service 242. In some embodiments, host system 210*a* may correspond to host system 110*a* of FIG. 1, execution environment 230 may correspond to execution environment 130 of FIG. 1, confidential virtual machine 232*a* may correspond to virtual machine 132*a* of FIG. 1, host OS 220 may correspond to host OS 120 of FIG. 1, VM manager 225 may correspond to hypervisor 125 of FIG. 1, client device 250 may correspond to client device 150 of FIG. 1, and image encryption service 242 may correspond to image encryption service 142 of FIG. 1.

Referring to FIG. 2, client device 250 uploads a confidential virtual machine (CVM) disk image template 262, a signature, and a public key associated with the signature to a repository 260. In some embodiments, the confidential virtual machine disk image template may be called a VM disk image. In some embodiments, the client device submits a request to the VM manager to launch a confidential virtual machine 232a with the disk image template 262 previously uploaded to the repository 260. The VM manager places a request to the image encryption service 242 for the disk image template 262. The image encryption service 242 retrieves, or receives, the disk image template 262 and signature from the repository 260, encrypts the disk image template 262 to create an encrypted confidential virtual machine (CVM) disk image and generated signature, and verifies that the retrieved signature matches that of the generated signature.

In some embodiments, the image encryption service 242 then performs full disk encryption on the CVM disk image and signs (the IES signature) a concatenation of the signature of the disk image template, the public key associated with the signature, and the FDE header of the encrypted CVM disk image to the ESP, with a private key associated with the image encryption service 242. The image encryption service 242 also writes the image encryption service certificate chain to the ESP. The image encryption service 242 then passes the encrypted CVM disk image to the VM manager 225.

In some embodiments, the VM manager launches confidential virtual machine 232a with the encrypted CVM disk image. In some embodiments, the confidential virtual machine 232a verifies the IES signature and extends the TPM vPCRs associated with the confidential virtual machine 232a with the IES signature and the IES' certificate chain. The confidential virtual machine 232a then unlocks the encrypted CVM disk image and boots the confidential virtual machine 232a using the, now decrypted, CVM disk image.

Post-boot, the client device 250 can request an attestation from the running confidential virtual machine 232a.

FIG. 3 is a depiction of an example of a client device transmitting a request to create an on-the-fly confidential virtual machine image in an on-the-fly confidential virtual machine architecture 300, in accordance with embodiments of the disclosure. On-the-fly confidential virtual machine architecture 300 may correspond to on-the-fly confidential virtual machine architecture 100, as previously described at FIG. 1. For clarity, some elements of the on-the-fly confidential virtual machine architecture 100 are not shown.

Referring to FIG. 3, client device 150 includes a request 306 and a plain text VM disk image 308 that is to be processed by on-the-fly confidential virtual machine system 140 for storage to repository 320 and subsequent deployment to one or more execution environments, e.g., execution environment 304a, which are supported by one or more host systems, e.g., host system 310a, of the on-the-fly confidential virtual machine architecture 300. In some embodiments, VM disk image 308 may correspond to VM disk image 262 of FIG. 2. Upon identifying the VM disk image 308 that is to be processed, the client device 150 may generate a request 306 that includes parameters for the on-the-fly confidential virtual machine system 140 that is to prepare VM disk image 308 for conversion into an on-the-fly confidential virtual machine image. It should be noted that request 306 and VM disk image 308 are shown for illustrative purposes only and are not physical components of client device 150.

In FIG. 3, the request 306 may include identification information for repository 320, indicating that repository 320 is to be used to store components of the on-the-fly confidential virtual machine to be generated from VM image 308. In some embodiments, the components may include a plain text virtual disk image and a signature of the plain text virtual disk image generated by an IES service. In some embodiments, the IES service may correspond to IES service 142 of FIG. 1. Upon generating the request 306, the client device 150 may transmit the request 306 that includes the identification information and the plain text VM disk image 308 to the on-the-fly confidential virtual machine system 140. The on-the-fly confidential virtual machine system 140 may use the identification information included in the request 306 to provide user parameters that are indicated in the request 306. In some embodiments, upon creation of a signature for the plain text virtual disk image 308, both the plain text virtual disk image 308 and its signature are copied to the repository 320.

Figure 4:
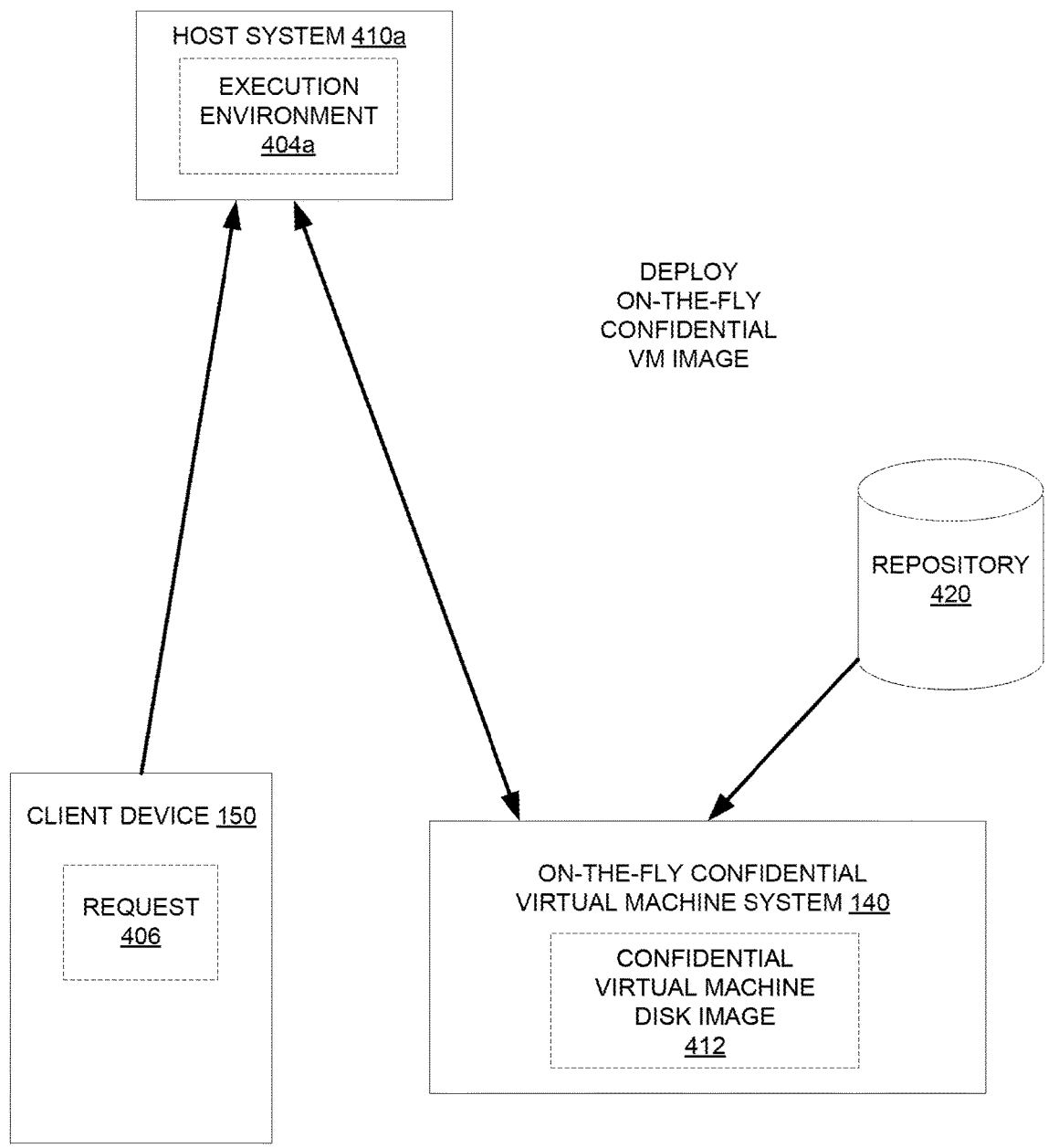
FIG. 4 is a depiction of an example of a client device transmitting a request to deploy a confidential virtual machine disk image of a confidential virtual machine architecture, in accordance with embodiments of the disclosure.

FIG. 4 is a depiction of an example of a client device transmitting a request to deploy an on-the-fly confidential virtual machine disk image of an on-the-fly confidential virtual machine architecture 400, in accordance with embodiments of the disclosure. On-the-fly confidential virtual machine architecture 400 may correspond to on-the-fly confidential virtual machine architecture 100, as previously described at FIG. 1. For clarity, some elements of the on-the-fly confidential virtual machine architecture 100 are not shown.

Referring to FIG. 4, client device 150 initiates a request 406 to host system 410a that is to be satisfied by on-the-fly confidential virtual machine system 140 of the on-the-fly confidential virtual machine architecture 400. In some embodiments, the request designates the desired confidential virtual machine disk image 412. In some embodiments, the request includes the address of repository 420, in which the desired confidential virtual machine disk image 412 is located. A VM manager or hypervisor on host system 410a can create an execution environment 404a and send a subsequent request, using information included in request 406, to on-the-fly confidential virtual machine system 140 for the desired confidential virtual machine disk image 412. In some embodiments, host system 410a may correspond to host system 110a of FIG. 1. In some embodiments, on-the-fly confidential virtual machine system 140 may utilize other criteria to determine the identification information for the desired confidential virtual machine disk image 412. It should be noted that request 406 and on-the-fly confidential virtual machine disk image 412 are shown for illustrative purposes only and are not physical components of client device 150.

In FIG. 4, in some embodiments, on-the-fly confidential virtual machine system 140 retrieves the desired confidential virtual machine disk image 412 and its signature from the repository 420. In some embodiments, the confidential virtual machine disk image 412 is in plain text and the signature represents a means of validating that the confidential virtual machine disk image has not been modified. In some embodiments, the signature comprises an encrypted hash of the entire confidential virtual machine disk image 412. In some embodiments, on-the-fly confidential virtual machine system 140 encrypts the plain text confidential virtual machine disk image 412 retrieved from the repository 420 using the private key associated with image encryption system 142, as shown in FIG. 1. In some embodiments, during encryption, the on-the-fly confidential virtual machine system 140 recalculates the signature from the confidential virtual machine disk image 412 retrieved from the repository 420 and compares it to the stored copy of the signature. In some embodiments, a mismatch between the stored and calculated signatures indicates tampering with the plain text confidential virtual machine disk image 412.

In some embodiments, the confidential virtual machine disk image 412 is encrypted using Authenticated Encryption with Associated Data (AEAD). AEAD binds associated data (AD) to the ciphertext and to the context where it is supposed to appear so that attempts to "cut-and-paste" a valid ciphertext into a different context are detected and rejected. AEAD encryption functions use Advanced Encryption Standard (AES) encryption. AES encryption takes plain text as input, along with a cryptographic key, and returns an encrypted sequence of bytes as output. This sequence of bytes can later be decrypted using the same key as was used to encrypt it. An advantage of AEAD is that without the key it is impossible to change the plain text underlying the ciphertext undetected.

In some embodiments, on-the-fly confidential virtual machine system 140 writes the signature to the ESP of the, now encrypted, confidential virtual machine disk image 412. In some embodiments, on-the-fly confidential virtual machine system 140 then again encrypts confidential virtual machine disk image 412 using FDE. In some embodiments, image encryption system 142 calculates an IES signature, using its private key, across the signature used to encrypt the plain text confidential virtual machine disk image 412, the public key associated with the signature, and the FDE header, and writes this IES signature to the ESP. In some embodiments, image encryption system 142, as part of on-the-fly confidential virtual machine system 140, then writes its certificate chain to the ESP of encrypted confidential virtual machine disk image 412.

In some embodiments, on-the-fly confidential virtual machine system 140 provides the encrypted confidential virtual machine disk image 412 to the execution environment 404a. In some embodiments, the execution environment 404a launches the encrypted confidential virtual machine disk image 412 in a target CVM. In some embodiments, the target CVM verifies the IES signature on the encrypted confidential virtual machine disk image 412. In some embodiments, the target CVM extends its TPM PCRs with the IES signature. In some embodiments, the target CVM further extends its TPM PCRs with the IES certificate chain from the ESP of the encrypted confidential virtual machine disk image 412. The target CVM then verifies the IES signature, decrypts/unlocks the encrypted confidential virtual machine disk image 412, and boots from the (now decrypted) confidential virtual machine disk image 412.

FIG. 5 is a depiction of an example of a client device transmitting an update to an on-the-fly confidential virtual machine of an on-the-fly confidential virtual machine architecture 500, in accordance with embodiments of the disclosure. On-the-fly confidential virtual machine architecture 500 may correspond to on-the-fly confidential virtual machine architecture 100, as previously described at FIG. 1. For clarity, some elements of the on-the-fly confidential virtual machine architecture 100 are not shown.

Referring to FIG. 5, client device 150 includes a request 506 and an updated plain text VM disk image 508 that is to be used by on-the-fly confidential virtual machine system 140 of the on-the-fly confidential virtual machine architecture 500 to replace an existing VM disk image in repository 520. Upon identifying the on-the-fly confidential virtual machine image that is to be updated, the client device 150 may generate a request 506 that includes identification information for the updated on-the-fly confidential virtual machine disk image 508. In some embodiments, the update includes a new virtual machine disk image to be uploaded to repository 520. In some embodiments, host system 510a may correspond to host system 110a of FIG. 1. In some embodiments, the client device 150 may determine the identification information in view of the new on-the-fly confidential virtual machine image 508 that is to be uploaded. It should be noted that request 506 and on-the-fly confidential virtual machine disk image 508 are shown for illustrative purposes only and are not physical components of client device 150.

In FIG. 5, the request 506 may include identification information for repository 520, indicating that repository 520 is to be used to store components of the on-the-fly confidential virtual machine disk image to be generated from VM disk image 508. In some embodiments, the components may include a new plain text virtual disk image and a new signature of the plain text virtual disk image generated by an IES service. In some embodiments, the IES service may correspond to IES service 142 of FIG. 1. Upon generating the request 506, the client device 150 may transmit the request 506 and the identification information to the on-the-fly confidential virtual machine provisioning system 140. The on-the-fly confidential virtual machine provisioning system 140 may use the identification information included in the request 506 to provide user parameters that are indicated in the request 506. In some embodiments, upon creation of a signature for the plain text virtual disk image 508, both the new plain text virtual disk image 508 and its signature are copied to the repository 520.

Figure 6:
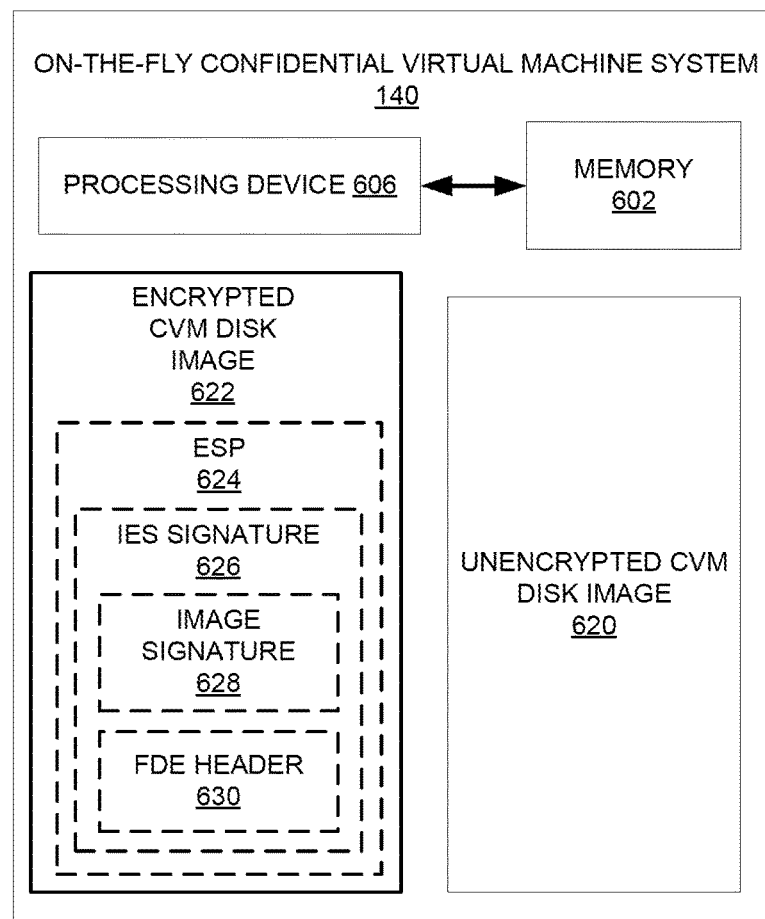
FIG. 6 is a component diagram depicting an example on-the-fly confidential virtual machine architecture, in accordance with embodiments of the disclosure.

FIG. 6 is a component diagram depicting an example on-the-fly confidential virtual machine architecture 600, in accordance with embodiments of the disclosure. The on-the-fly confidential virtual machine architecture 600 includes host system 610a, execution environment 604a, processing device 606, memory 602, and on-the-fly confidential virtual machine system 140. Host system 610a may correspond to host system 110a of FIG. 1. Execution environment 604a may correspond to execution environment 104a of FIG. 1. Execution environment 604a may include VMs, containers, or one or more containers within a VM. Although illustrated as each having one execution environment, in some embodiments host system 710a may include any number of execution environments. On-the-fly confidential virtual machine system 140 may correspond to on-the-fly confidential virtual machine system 140 of FIG. 1. In some embodiments, processing device 606 may correspond to 160a of FIG. 1. In some embodiments, memory 602 may include volatile memory devices, e.g., random access memory (RAM), non-volatile memory devices, e.g., flash memory, and/or other types of memory devices.

Execution environment 604a may submit a request 612 for an encrypted CVM disk. In response, on-the-fly confidential virtual machine system 140 may obtain an unencrypted CVM disk image 620. Unencrypted CVM disk image 620 may then be encrypted, resulting in an image signature 628 and encrypted CVM disk image 622. Full disk encryption can then be applied against the encrypted CVM disk image to produce a full disk encryption (FDE) header. A concatenation of the image signature 628, the public key associated with the signature, and the FDE header 630 can then be signed to produce an image encryption service (IES) signature 626. The IES signature 626 can then be written to extensible firmware interface system partition (ESP) 624 of the encrypted CVM disk image 622. It should be noted that request 612, encrypted CVM disk image 622, ESP 624, IES signature 626, image signature 628, FDE header 630, and unencrypted CVM disk image 620 are shown for illustrative purposes only and are not physical components of on-the-fly confidential virtual machine system 140.

FIG. 7 is a flow diagram of a method 700 of provisioning an on-the-fly confidential virtual machine disk image, in accordance with some embodiments. Method 700 may be performed by processing logic that may comprise hardware, e.g., circuitry, dedicated logic, programmable logic, a processor, a processing device, a central processing unit (CPU), a system-on-a-chip (SoC), software, e.g., instructions running/executing on a processing device, firmware, e.g., microcode, or a combination thereof. In some embodiments, at least a portion of method 700 may be performed by on-the-fly confidential virtual machine system 140 of FIG. 1.

With reference to FIG. 7, method 700 illustrates example functions used by various embodiments. Although specific function blocks ("blocks") are disclosed in method 700, such blocks are examples. That is, some embodiments are well suited to performing various other blocks or variations of the blocks recited in method 700. It is appreciated that the blocks in method 700 may be performed in an order different than presented, and that not all of the blocks in method 700 may be performed.

Method 700 begins at block 710, where, responsive to a request for an encrypted confidential virtual machine (CVM), the processing logic obtains a plain text disk image template and a signature associated with the plain text disk image template. In some embodiments, the plain text disk image template corresponds to VM disk image 262 of FIG. 2. A host, such as host system host system 410*a* of FIG. 4, can create an execution environment, such as execution environment 404*a* of FIG. 4, and send a request for an encrypted CVM disk image. In some embodiments, the signature constitutes a hash of the virtual machine disk image. In some embodiments, the plain text disk image template and signature are obtained from a repository. In some embodiments, the repository corresponds to repository 420 of FIG. 4.

At block 720, the processing logic can process the plain text disk image template to produce an encrypted CVM disk image and verify the signature of the plain text image template. In some embodiments, creation of a signature starts with a hash of the original document. The hash is then encrypted with a private key. Verification of the signature involves decrypting it using a public key to obtain the original hash, and then comparing this to a hash of the data whose integrity needs to be established.

At block 730, the processing logic can apply full disk encryption (FDE) against the encrypted CVM disk image to obtain an FDE header. In some embodiments, FDE may be achieved using Linux Unified Key Setup (LUKS). In some embodiments, FDE may be achieved using Microsoft's BitLocker Drive Encryption. Other methods of FDE are contemplated.

At block 740, the processing logic can sign the concatenation of the signature, the public key associated with the signature, and the FDE header to obtain an image encryption service (IES) signature. In some embodiments, this signing is performed using the private key of an IES private/public key pair.

At block 750, the processing logic can write the IES signature to the ESP of the encrypted CVM disk image to produce the signed encrypted CVM disk image. In some embodiments, the processing logic write the IES certificate chain to the ESP of the signed encrypted CVM disk image.

Figure 8:
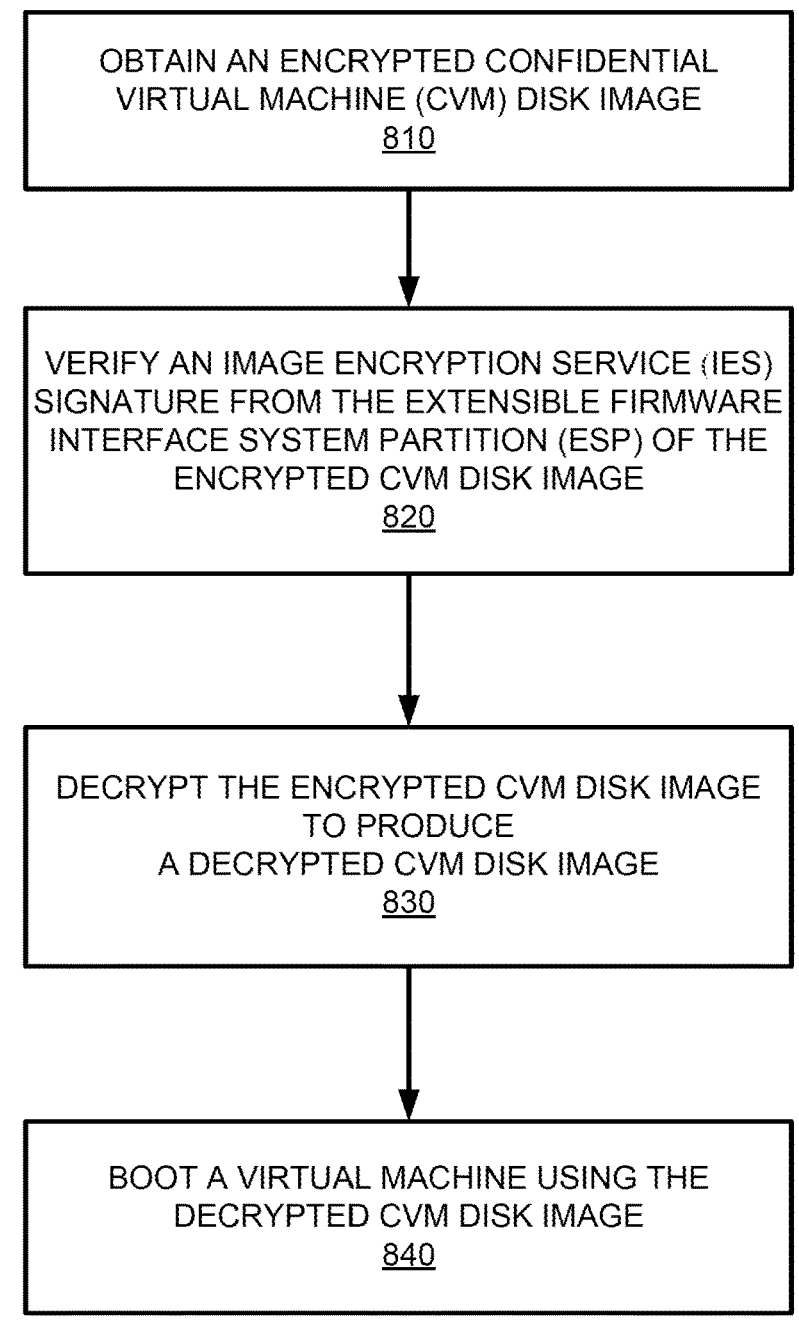
FIG. 8 is a flow diagram of a method of deploying an on-the-fly confidential virtual machine disk image, in accordance with some embodiments.

FIG. 8 is a flow diagram of a method 800 of deploying an on-the-fly CVM disk image, in accordance with some embodiments. Method 800 may be performed by processing logic that may comprise hardware, e.g., circuitry, dedicated logic, programmable logic, a processor, a processing device, a central processing unit (CPU), a system-on-a-chip (SoC), software, e.g., instructions running/executing on a processing device, firmware, e.g., microcode, or a combination thereof. In some embodiments, at least a portion of method 800 may be performed by on-the-fly confidential virtual machine system 140 of FIG. 1.

With reference to FIG. 8, method 800 illustrates example functions used by various embodiments. Although specific function blocks ("blocks") are disclosed in method 800, such blocks are examples. That is, embodiments are well suited to performing various other blocks or variations of the blocks recited in method 800. It is appreciated that the blocks in method 800 may be performed in an order different than presented, and that not all of the blocks in method 800 may be performed.

Method 800 begins at block 810, where the processing logic obtains an encrypted CVM disk image. In some embodiments, obtaining the CVM disk image may include retrieving it from an on-the-fly confidential virtual machine system. In some embodiments, the on-the-fly confidential virtual machine system may correspond to the on-the-fly confidential virtual machine system 140 of FIG. 1. In some embodiments, obtaining a CVM disk image comprises launching a TEE using an embedded VMM.

At block 820, the processing logic verifies the IES signature from the ESP of the encrypted CVM disk image. In some embodiments, the launching (bootstrapping) software of the virtual machine can read the IES signature and the public key associated with the IES signature from the ESP and the FDE header of the encrypted disk image and verify the signature of their concatenation. Upon verification of the IES signature, in some embodiments, the bootstrapping software can extend a designated PCR in the vTPM device with the signature, or hash, of the unencrypted CVM disk image and the certificate chain that signed the IES certificate.

At block 830, the processing logic decrypts the encrypted CVM disk image to produce a decrypted CVM disk image. In some embodiments, the processing logic opens the encrypted CVM disk image, using a passphrase, that is made available after the integrity and confidentiality of the CVM has been verified, to produce the decrypted CVM disk image. In some embodiments the passphrase, used to unlock the encrypted CVM disk image, was encrypted against the vTPM in such a way that it can only be released when PCR measurements predicted prior to boot, match the actual PCR measurements.

At block 840, the processing logic causes the virtual machine to boot using the decrypted CVM disk image. In some embodiments, subsequent to booting, the running virtual machine produces an attestation report and TPM event log, and validate that the signature of the disk image matches that of the originally uploaded disk image and the certificate authority (CA) chain matches the CA known to issue certificates to the IES. This can further establish that the encrypted CVM disk image (root disk) was produced by an IES that is running fully attested software and the encrypted CVM disk image was populated by the content from the plain text disk image and has not been tampered with.

Figure 9:
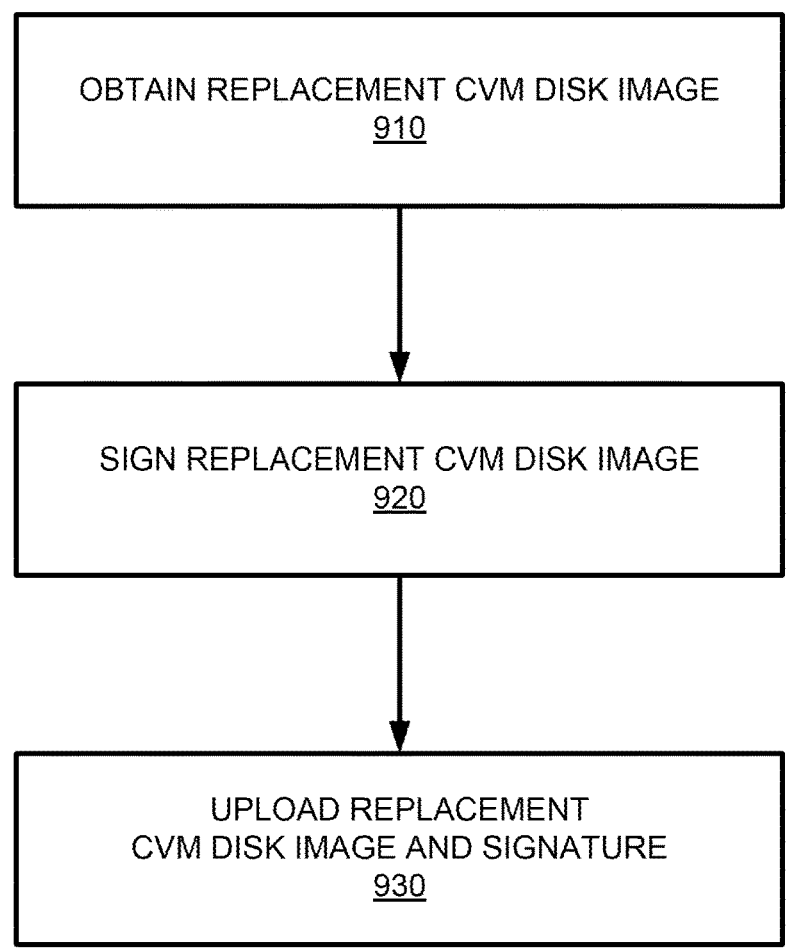
FIG. 9 is a flow diagram of a method of updating an on-the-fly confidential virtual machine disk image, in accordance with some embodiments.

FIG. 9 is a flow diagram of a method 900 of updating an on-the-fly CVM disk image, in accordance with some embodiments. Method 900 may be performed by processing logic that may comprise hardware, e.g., circuitry, dedicated logic, programmable logic, a processor, a processing device, a central processing unit (CPU), a system-on-chip (SoC), software, e.g., instructions running/executing on a processing device, firmware, e.g., microcode, or a combination thereof. In some embodiments, at least a portion of method 900 may be performed by on-the-fly confidential virtual machine system 140 of FIG. 1.

With reference to FIG. 9, method 900 illustrates example functions used by various embodiments. Although specific function blocks ("blocks") are disclosed in method 900, such blocks are examples. That is, embodiments are well suited to performing various other blocks or variations of the blocks recited in method 900. It is appreciated that the blocks in method 900 may be performed in an order different than presented, and that not all of the blocks in method 900 may be performed.

Method 900 begins at block 910, where the processing logic receives, from a client device, a request to update a CVM disk image. In some embodiments, the CVM disk image corresponds to VM disk image 262 of FIG. 2. As part of the update request, the processing logic obtains an updated replacement plain text CVM disk image. In some embodiments, the processing logic replaces the existing plain text CVM disk image with a new plain text CVM disk image.

At block 920, the processing logic signs the replacement confidential virtual disk image, resulting in a new signature. In some embodiments, the new signature constitutes a hash of the replacement CVM disk image. In some embodiments, the existing CVM disk image corresponds to the VM disk image 262 of FIG. 2.

At block 930, the processing logic uploads the confidential replacement virtual disk image and the new signature to a repository. In some embodiments, the repository corresponds to repository 520 of FIG. 5.

Figure 10:
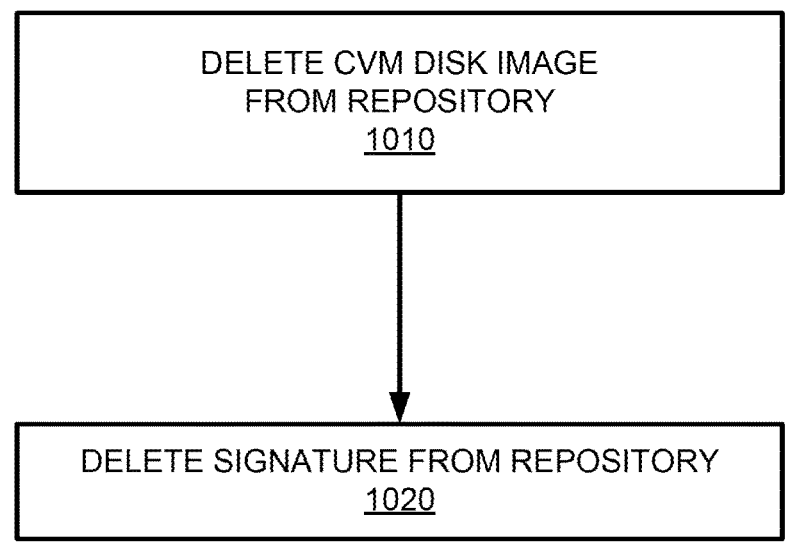
FIG. 10 is a flow diagram of a method of revoking an on-the-fly confidential virtual machine disk image, in accordance with some embodiments.

FIG. 10 is a flow diagram of a method 1000 of revoking an on-the-fly CVM disk image, in accordance with some embodiments. Method 1000 may be performed by processing logic that may comprise hardware, e.g., circuitry, dedicated logic, programmable logic, a processor, a processing device, a central processing unit (CPU), or a system-on-chip (SoC), software, e.g., instructions running/executing on a processing device, firmware, e.g., microcode, or a combination thereof. In some embodiments, at least a portion of method 1000 may be performed by on-the-fly confidential virtual machine system 140 of FIG. 1.

With reference to FIG. 10, method 1000 illustrates example functions used by various embodiments. Although specific function blocks ("blocks") are disclosed in method 1000, such blocks are examples. That is, embodiments are well suited to performing various other blocks or variations of the blocks recited in method 1000. It is appreciated that the blocks in method 1000 may be performed in an order different than presented, and that not all of the blocks in method 1000 may be performed.

Method 1000 begins at block 1010, where the processing logic of the on-the-fly CVM system deletes the CVM disk image from the repository. In some embodiments, rather than deletion, the repository may mark the virtual machine disk image as invalid.

At block 1020, the processing logic of the on-the-fly confidential virtual machine system deletes the signature from the repository. In some embodiments, rather than deletion, the repository may mark the confidential virtual machine disk image as invalid. In some embodiments, the processing logic may add the certificate associated with the signature to a certificate revocation list. In some embodiments, the on-the-fly confidential virtual machine system may correspond to the on-the-fly confidential virtual machine system 140 of FIG. 1.

Figure 11:
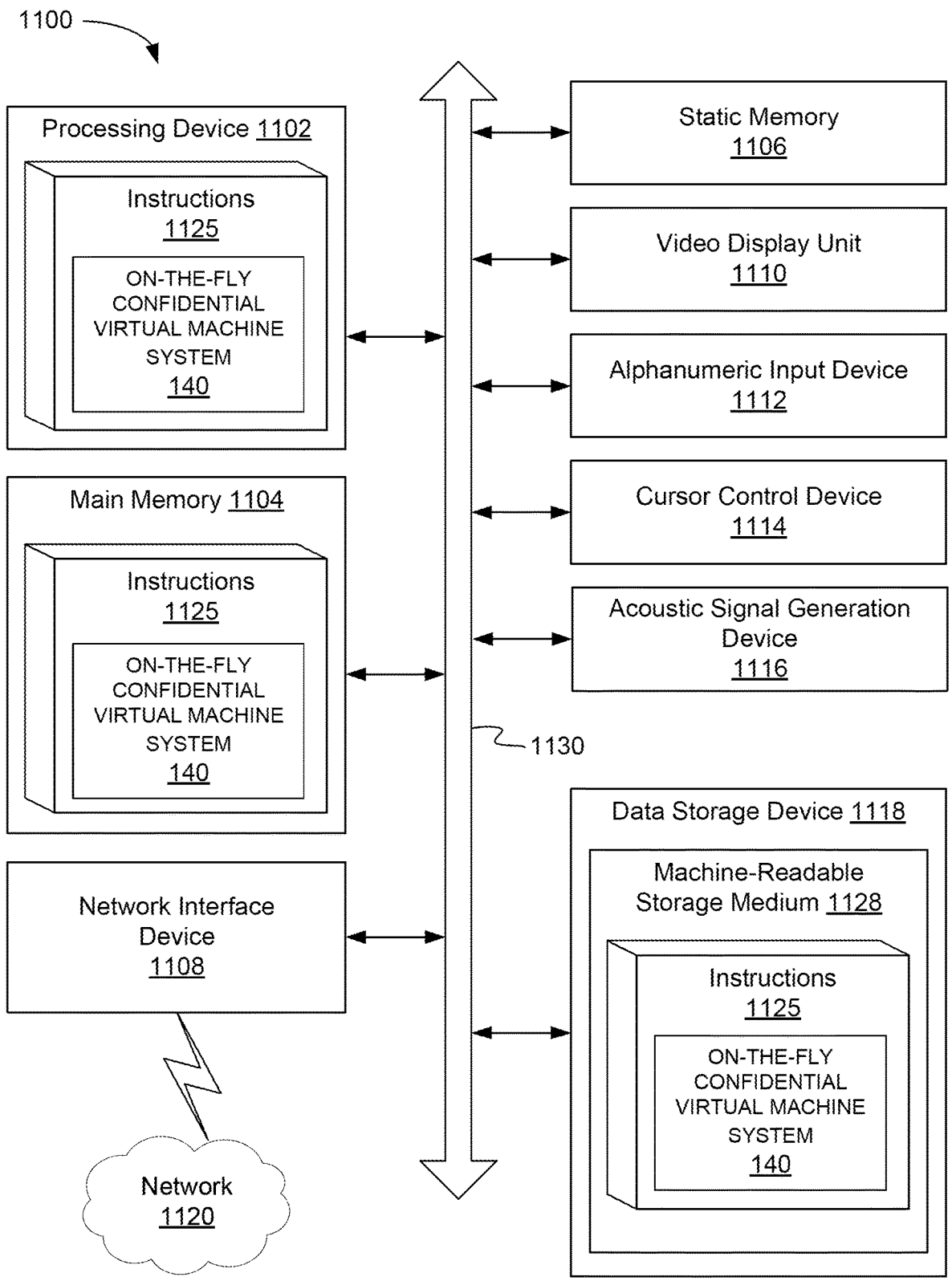
FIG. 11 is a block diagram of an example computing device that may perform one or more of the operations described herein, in accordance with some embodiments of the present disclosure.

FIG. 11 is a block diagram of an example computing device 1100 that may perform one or more of the operations described herein, in accordance with some embodiments. Computing device 1100 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, a switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 1100 may include a processing device 1102, e.g., a general-purpose processor or a programmable logic device (PLD), a main memory 1104, e.g., a synchronous dynamic random-access memory (DRAM) or a read-only memory (ROM), a static memory 1106, e.g., flash memory, and a data storage device 1118, which may communicate with each other via a bus 1130.

Processing device 1102 may be provided by one or more general-purpose processing devices such as a microprocessor, central processing unit, or the like. In an illustrative example, processing device 1102 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 1102 may also include one or more special-purpose processing devices such as an application specific integrated circuit (ASIC), a field programmable gate array (FPGA), a digital signal processor (DSP), a network processor, or the like. The processing device 1102 may be configured to execute the operations described herein, in accordance with one or more aspects of the present disclosure, for performing the operations and steps discussed herein.

Computing device 1100 may further include a network interface device 1108 which may communicate with a network 1120. The computing device 1100 also may include a video display unit 1110, e.g., a liquid crystal display (LCD) or a cathode ray tube (CRT), an alphanumeric input device 1112, e.g., a keyboard, a cursor control device 1114, e.g., a mouse, and an acoustic signal generation device 1116, e.g., a speaker. In one embodiment, video display unit 1110, alphanumeric input device 1112, and cursor control device 1114 may be combined into a single component or device, e.g., an LCD touch screen.

Data storage device 1118 may include a computer-readable storage medium 1128 on which may be stored one or more sets of instructions 1125 that may include instructions for an on-the-fly confidential virtual machine provisioning system 140, further including an image encryption service (not shown) for carrying out the operations described herein, in accordance with one or more aspects of the present disclosure. Instructions 1125 may also reside, completely or at least partially, within main memory 1104 and/or within processing device 1102 during execution thereof by computing device 1100, main memory 1104 and processing device 1102 also constituting computer-readable media. The instructions 1125 may further be transmitted or received over a network 1120 via network interface device 1108.

While computer-readable storage medium 1128 is shown in an illustrative example to be a single medium, the term "computer-readable storage medium" should be taken to include a single medium or multiple media, e.g., a centralized or distributed database and/or associated caches and servers, that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Example 1 is a method comprising: responsive to a request for an encrypted confidential virtual machine (CVM) disk image, obtaining an unencrypted CVM disk image, an image signature, and a public key associated with the image signature; encrypting the CVM disk image to produce an encrypted CVM disk image; applying full disk encryption (FDE) against the encrypted CVM disk image to obtain an FDE header; signing, by a processing device, a concatenation of the image signature, the public key associated with the signature, and the FDE header to obtain an image encryption service (IES) signature; and writing the IES signature to an extensible firmware interface system partition (ESP) of the encrypted CVM disk image.

Example 2 is the method of Example 1, further comprising writing the image signature to the ESP of the encrypted CVM disk image.

Example 3 is the method of Example 1, further comprising writing, to the ESP, a certificate chain associated with the IES signature.

Example 4 is the method of Example 1, wherein encrypting the CVM disk image comprises verifying the image signature.

Example 5 is the method of Example 1, wherein the CVM disk image is encrypted using authenticated encryption with associated data (AEAD).

Example 6 is the method of Example 1, wherein the signature comprises an encrypted hash.

Example 7 is the method of Example 1, wherein signing the concatenation of the signature, the public key associated with the signature, and the FDE header is performed using a private key of a private key/public key pair, the private key/public key pair associated with a certificate authority.

Example 8 is a system comprising a memory; and a processing device, operatively coupled to the memory, to: responsive to a request for an encrypted confidential virtual machine (CVM) disk image, obtain an unencrypted CVM disk image, an image signature, and a public key associated with the image signature; encrypt the CVM disk image to produce an encrypted CVM disk image; apply full disk encryption (FDE) against the encrypted CVM disk image to obtain an FDE header; sign, by the processing device, a concatenation of the image signature, the public key associated with the signature, and the FDE header to obtain an image encryption service (IES) signature; and write the IES signature to an extensible firmware interface system partition (ESP) of the encrypted CVM disk image.

Example 9 is the system of Example 8, wherein the instructions further cause the processing device to write the image signature to the ESP of the encrypted CVM disk image.

Example 10 is the system of Example 8, wherein the instructions further cause the processing device to write, to the ESP, a certificate chain associated with the IES signature.

Example 11 is the system of Example 8, wherein to encrypt the CVM disk image is further to verify the image signature.

Example 12 is the system of Example 8, wherein the CVM disk image is encrypted using authenticated encryption with associated data (AEAD).

Example 13 is the system of Example 8, wherein the signature comprises an encrypted hash.

Example 14 is the system of Example 8, wherein to sign the concatenation of the signature, the public key associated with the signature, and the FDE header is further to use a private key of a private key/public key pair, the private key/public key pair associated with a certificate authority.

Example 15 is a non-transitory computer-readable storage medium including instructions that, when executed by a processing device, cause the processing device to: responsive to a request for an encrypted confidential virtual machine (CVM) disk image, obtain an unencrypted CVM disk image, an image signature, and a public key associated with the image signature; encrypt the CVM disk image to produce an encrypted CVM disk image; apply full disk encryption (FDE) against the encrypted CVM disk image to obtain an FDE header; sign, by the processing device, a concatenation of the image signature, the public key associated with the image signature, and the FDE header to obtain an image encryption service (IES) signature; and write the IES signature to an extensible firmware interface system partition (ESP) of the encrypted CVM disk image.

Example 16 is the non-transitory computer-readable storage medium of Example 15, wherein the instructions further cause the processing device to write the image signature to the ESP of the encrypted CVM disk image.

Example 17 is the non-transitory computer-readable storage medium of Example 15, wherein to encrypt the CVM disk image is further to verify the image signature.

Example 18 is the non-transitory computer-readable storage medium of Example 15, wherein the CVM disk image is encrypted using authenticated encryption with associated data (AEAD).

Example 19 is the non-transitory computer-readable storage medium of Example 15, wherein the signature comprises an encrypted hash.

Example 20 is the non-transitory computer-readable storage medium of Example 15, wherein to sign the concatenation of the image signature, the public key associated with the image signature, and the FDE header is further to use a private key of a private key/public key pair, the private key/public key pair associated with a certificate authority.

Example 21 is a system comprising: a memory; and a processing device, operatively coupled to the memory, to: obtain an encrypted confidential virtual machine (CVM) disk image; verify an image encryption service (IES) signature from an extensible firmware interface system partition (ESP) of the encrypted CVM disk image; decrypt the encrypted CVM disk image to produce a decrypted CVM disk image; and boot a virtual machine using the decrypted CVM disk image.

Example 22 is the system of Example 21, wherein the processing device is further to, after booting, resulting in a running virtual machine, cause the running virtual machine to provide an attestation.

Example 23 is the system of Example 21, wherein to decrypt the encrypted CVM disk image is further to use a passphrase that is released after an attestation of the running VM has been validated.

Example 24 is the system of Example 21, wherein the processing device is further to extend a virtual trusted platform module (vTPM) platform configuration register (PCR) with the IES signature.

Example 25 is the system of Example 21, wherein the processing device is further to extend a virtual trusted vTPM PCR with a certificate chain.

Example 26 is the system of Example 22, wherein the encrypted CVM disk image is decrypted using authenticated encryption with associated data (AEAD).

Example 27 is the system of Example 22, wherein a passphrase used to unlock the encrypted CVM disk image is released when the PCR measurements predicted prior to boot of the CVM, match the PCR measurements of the actual boot attempt.

Example 28 is a method comprising: obtaining an encrypted confidential virtual machine (CVM) disk image; verifying an image encryption service (IES) signature from an extensible firmware interface system partition (ESP) of the encrypted CVM disk image; decrypting the encrypted CVM disk image to produce a decrypted CVM disk image; and booting a virtual machine using the decrypted CVM disk image.

Example 29 is the method of Example 28, further comprising, booting the virtual machine resulting in a running virtual machine, causing the running virtual machine to provide an attestation.

Example 30 is the method of Example 28, wherein decrypting the encrypted CVM disk image comprises using a passphrase that is released after an attestation of the running VM has been validated.

Example 31 is the method of Example 28, further comprising extending a virtual trusted platform module (vTPM) platform configuration register (PCR) with the IES signature.

Example 32 is the method of Example 28, further comprising extending a virtual trusted vTPM PCR with a certificate chain associated with the IES signature.

Example 33 is the method of Example 28, further comprising decrypting the encrypted CVM disk image using authenticated encryption with associated data (AEAD).

Example 34 is the method of Example 28, wherein the IES signature comprises a concatenation of an image signature and the public key associated with the signature, the image signature comprising a first cryptographic operation against the decrypted CVM disk image, and an FDE header, the FDE header comprising a second cryptographic operation against the encrypted CVM disk image.

Example 35 is an apparatus comprising: responsive to a request for an encrypted confidential virtual machine (CVM) disk image, a means for obtaining an unencrypted CVM disk image and an image signature associated with the CVM disk image; a means for encrypting the CVM disk image to produce an encrypted CVM disk image; a means for applying full disk encryption (FDE) against the encrypted CVM disk image to obtain an FDE header; a means for signing a concatenation of the image signature, the public key associated with the signature, and the FDE header to obtain an image encryption service (IES) signature; and a means for writing the IES signature to an extensible firmware interface system partition (ESP) of the encrypted CVM disk image.

Example 36 is the apparatus of Example 35, further comprising a means for writing the image signature to the ESP of the encrypted CVM disk image.

Example 37 is the apparatus of Example 35, further comprising writing, to the ESP, a certificate chain associated with the IES signature.

Example 38 is the apparatus of Example 35, wherein the means for encrypting the CVM disk image comprises: a means for creating a generated signature from the CVM disk image; and a means for determining the generated signature is identical to the signature.

Example 39 is the apparatus of Example 35, wherein the CVM disk image is encrypted using authenticated encryption with associated data (AEAD).

Example 40 is the apparatus of example 35, wherein the signature comprises a hash of the disk image, and the hash is then encrypted with a private key. In some embodiments, the signature can be verified by decrypting it to get the original hash, and comparing this to a hash of the untrusted data.

Unless specifically stated otherwise, terms such as "requesting," "obtaining," "encrypting," "applying," "signing," "writing," "decrypting," or the like, refer to actions and processes performed or implemented by computing devices that manipulate and transform data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general-purpose computing device selectively programmed by a computer program stored in the computing device. Such a computer program may be stored in a computer-readable non-transitory storage medium.

The methods and illustrative examples described herein are not inherently related to any particular computer or other apparatus. Various general-purpose systems may be used in accordance with the teachings described herein, or it may prove convenient to construct more specialized apparatus to perform the required method steps. The required structure for a variety of these systems will appear as set forth in the description above.

The above description is intended to be illustrative and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times, or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure, e.g., circuitry, that performs the task or tasks during operation. As such, the unit/circuit/component can be said to be configured to perform the task, or configurable to perform the task, even when the specified unit/circuit/component is not currently operational, e.g., is not on. The units/circuits/components used with the "configured to" or "configurable to" language include hardware, e.g., circuits and memory storing program instructions executable to implement the operation. Reciting that a unit/circuit/component is "configured to" perform one or more tasks, or is "configurable to" perform one or more tasks, is expressly intended not to invoke 35 U.S.C. § 112 (f) for that unit/circuit/component. Additionally, "configured to" or "configurable to" can include generic structure, e.g., generic circuitry, that is manipulated by software and/or firmware, e.g., an FPGA or a general-purpose processor executing software, to operate in manner that is capable of performing the task(s) at issue. "Configured to" may also include adapting a manufacturing process, e.g., a semiconductor fabrication facility, to fabricate devices, e.g., integrated circuits, that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
responsive to a request for an encrypted confidential virtual machine (CVM) disk image, obtaining an unencrypted CVM disk image, an image signature, and a public key associated with the image signature;
encrypting the CVM disk image to produce an encrypted CVM disk image;
applying full disk encryption (FDE) against the encrypted CVM disk image to obtain an FDE header;
signing, by a processing device, a concatenation of the image signature, the public key associated with the image signature, and the FDE header to obtain an image encryption service (IES) signature; and
writing the IES signature to an extensible firmware interface system partition (ESP) of the encrypted CVM disk image.

2. The method of claim 1, further comprising writing the image signature to the ESP of the encrypted CVM disk image.

3. The method of claim 1, further comprising writing, to the ESP, a certificate chain associated with the IES signature.

4. The method of claim 1, wherein encrypting the CVM disk image comprises verifying the image signature.

5. The method of claim 1, wherein the CVM disk image is encrypted using authenticated encryption with associated data (AEAD).

6. The method of claim 1, wherein the image signature comprises an encrypted hash.

7. The method of claim 1, wherein signing the concatenation of the image signature and the FDE header is performed using a private key of a private key/public key pair, the private key/public key pair associated with a certificate authority.

8. A system comprising:
a memory; and
a processing device, operatively coupled to the memory, to:
responsive to a request for an encrypted confidential virtual machine (CVM) disk image, obtain an unencrypted CVM disk image, an image signature, and a public key associated with the image signature;
encrypt the CVM disk image to produce an encrypted CVM disk image; apply full disk encryption (FDE) against the encrypted CVM disk image to obtain an FDE header;
sign a concatenation of the image signature, the public key associated with the image signature, and the FDE header to obtain an image encryption service (IES) signature; and
write the IES signature to an extensible firmware interface system partition (ESP) of the encrypted CVM disk image.

9. The system of claim 8, wherein the processing device is further to write the image signature to the ESP of the encrypted CVM disk image.

10. The system of claim 8, wherein the processing device is further to write, to the ESP, a certificate chain associated with the IES signature.

11. The system of claim 8, wherein, to encrypt the CVM disk image, the processing device is further to verify the image signature.

12. The system of claim 8, wherein the CVM disk image is encrypted using authenticated encryption with associated data (AEAD).

13. The system of claim 8, wherein the image signature comprises an encrypted hash.

14. The system of claim 8, wherein, to sign the concatenation of the image signature and the FDE header, the processing device is further to use a private key of a private key/public key pair, the private key/public key pair associated with a certificate authority.

15. A non-transitory computer-readable storage medium including instructions that, when executed by a processing device, cause the processing device to:
responsive to a request for an encrypted confidential virtual machine (CVM) disk image, obtain an unencrypted CVM disk image, an image signature, and a public key associated with the image signature;

encrypt the CVM disk image to produce an encrypted CVM disk image;

apply full disk encryption (FDE) against the encrypted CVM disk image to obtain an FDE header;

sign, by the processing device, a concatenation of the image signature, the public key associated with the image signature, and the FDE header to obtain an image encryption service (IES) signature; and write the IES signature to an extensible firmware interface system partition (ESP) of the encrypted CVM disk image.

16. The non-transitory computer-readable storage medium of claim 15, wherein the instructions further cause the processing device to write the image signature to the ESP of the encrypted CVM disk image.

17. The non-transitory computer-readable storage medium of claim 15, wherein, to encrypt the CVM disk image, the instructions further cause the processing device to verify the image signature.

18. The non-transitory computer-readable storage medium of claim 15, wherein the CVM disk image is encrypted using authenticated encryption with associated data (AEAD).

19. The non-transitory computer-readable storage medium of claim 15, wherein the image signature comprises an encrypted hash.

20. The non-transitory computer-readable storage medium of claim 15, wherein, to sign the concatenation of the image signature, the public key associated with the image signature, and the FDE header, the instructions further cause the processing device to use a private key of a private key/public key pair, the private key/public key pair associated with a certificate authority.

* * * * *